United States Patent
Fukuta et al.

(10) Patent No.: US 10,348,425 B2
(45) Date of Patent: Jul. 9, 2019

(54) RADIO TERMINAL AND PROCESSOR

(71) Applicant: KYOCERA CORPORATION, Kyoto (JP)

(72) Inventors: Noriyoshi Fukuta, Inagi (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/041,185

(22) Filed: Jul. 20, 2018

(65) Prior Publication Data

US 2018/0351665 A1 Dec. 6, 2018

Related U.S. Application Data

(63) Continuation of application No. PCT/JP2017/001799, filed on Jan. 19, 2017.
(Continued)

(51) Int. Cl.
*H04W 24/10* (2009.01)
*H04B 17/318* (2015.01)
(Continued)

(52) U.S. Cl.
CPC .......... *H04B 17/318* (2015.01); *H04B 17/26* (2015.01); *H04L 1/0026* (2013.01); *H04W 16/14* (2013.01);
(Continued)

(58) Field of Classification Search
CPC . H04W 16/32; H04W 36/0083; H04W 48/20; H04W 24/10; H04W 88/08; H04W 36/00; H04W 36/0055; H04W 36/32; H04W 48/18; H04W 84/045; H04W 36/0005; H04W 48/10; H04W 52/40; H04W 16/16; H04W 16/18; H04W 16/24; H04W 40/04; H04W 48/06; H04W 64/003; H04W 88/06; H04W 92/20; H04W 4/02; H04W 24/02; H04W 4/029; H04W 8/02; H04W 52/0245; H04W 52/0229;
(Continued)

(56) References Cited

U.S. PATENT DOCUMENTS 6,157,838 A * 12/2000 Di Huo ................ H04W 24/02
455/439
2005/0037775 A1* 2/2005 Moeglein .............. G01S 5/0036
455/456.1
(Continued)

FOREIGN PATENT DOCUMENTS

| JP | H06-132881 A | 5/1994 |
|---|---|---|
| JP | 2013-150049 A | 8/2013 |
| WO | 2013/161135 A1 | 10/2013 |

*Primary Examiner* — Nimesh Patel
(74) *Attorney, Agent, or Firm* — Studebaker & Brackett PC

(57) ABSTRACT

A radio terminal according to one embodiment supports MDT. The radio terminal comprises: a receiver configured to receive configuration information from a network, the configuration information setting an RSSI measurement in an unlicensed frequency band and an acquisition of location information of the radio terminal; a controller configured to perform the RSSI measurement and the acquisition of the location information, based on the configuration information; and a transmitter configured to transmit an RSSI measurement result together with the location information, to the network.

11 Claims, 8 Drawing Sheets

Related U.S. Application Data

(60) Provisional application No. 62/281,848, filed on Jan. 22, 2016.

(51) Int. Cl.

| | | |
|---|---|---|
| *H04W 16/14* | (2009.01) | |
| *H04W 16/18* | (2009.01) | |
| *H04L 1/00* | (2006.01) | |
| *H04W 72/08* | (2009.01) | |
| *H04B 17/26* | (2015.01) | |
| *H04W 76/27* | (2018.01) | |
| *H04W 24/08* | (2009.01) | |

(52) U.S. Cl.
CPC ............ *H04W 16/18* (2013.01); *H04W 24/10* (2013.01); *H04W 72/085* (2013.01); *H04W 24/08* (2013.01); *H04W 76/27* (2018.02)

(58) Field of Classification Search
CPC ...... H04W 72/04; H04W 28/06; H04W 88/12; H04W 8/26; H04W 24/06; H04W 36/00835; H04W 52/0206; H04W 52/0225; H04W 64/00; H04W 24/08; H04W 72/082; H04W 24/00; H04W 16/14; H04W 16/26; H04W 40/244; H04W 72/085; H04J 11/0093; H04B 17/345; H04B 17/318; H04B 7/2606; H04B 17/24; H04B 17/0085; H04B 17/309; H04B 7/0626; H04B 17/29; H04B 17/327; H04B 3/46; H04B 7/0408; H04B 7/08; G01S 5/0252; G01S 19/23; G01S 19/235; G01S 19/39; Y02D 70/00; Y02D 70/1262; Y02D 70/1264; Y02D 70/142; Y02D 70/146; Y02D 70/164; Y02D 70/144; Y02D 70/162; Y02D 70/22; Y02D 70/124; H04L 1/0026; H04L 5/0073; H04L 5/14; H04L 43/16; H04L 5/1469; H04L 5/0007
See application file for complete search history.

(56) References Cited

U.S. PATENT DOCUMENTS

| | | | |
|---|---|---|---|
| 2006/0046709 A1* | 3/2006 | Krumm | H04N 21/4126 455/422.1 |
| 2006/0105759 A1* | 5/2006 | Betge-Brezetz | H04W 24/00 455/422.1 |
| 2007/0004428 A1* | 1/2007 | Morgan | G01S 5/02 455/456.1 |
| 2007/0147283 A1* | 6/2007 | Laroia | H04L 45/02 370/328 |
| 2010/0008246 A1* | 1/2010 | Watanabe | H04L 1/20 370/252 |
| 2012/0021690 A1* | 1/2012 | Smith | H01Q 1/1257 455/63.4 |
| 2013/0190009 A1* | 7/2013 | Johansson | H04W 64/003 455/456.1 |
| 2013/0310064 A1* | 11/2013 | Brachet | G01S 5/0236 455/456.1 |
| 2014/0228017 A1* | 8/2014 | Chang | H04W 24/08 455/422.1 |
| 2014/0304770 A1* | 10/2014 | Jung | H04W 12/12 726/2 |
| 2014/0342752 A1* | 11/2014 | Jones | G01S 5/02 455/456.1 |
| 2015/0050939 A1 | 2/2015 | Futaki et al. | |
| 2016/0157204 A1* | 6/2016 | Fukuta | H04W 8/22 455/456.2 |
| 2017/0285180 A1* | 10/2017 | Wang | G01S 19/14 |

\* cited by examiner

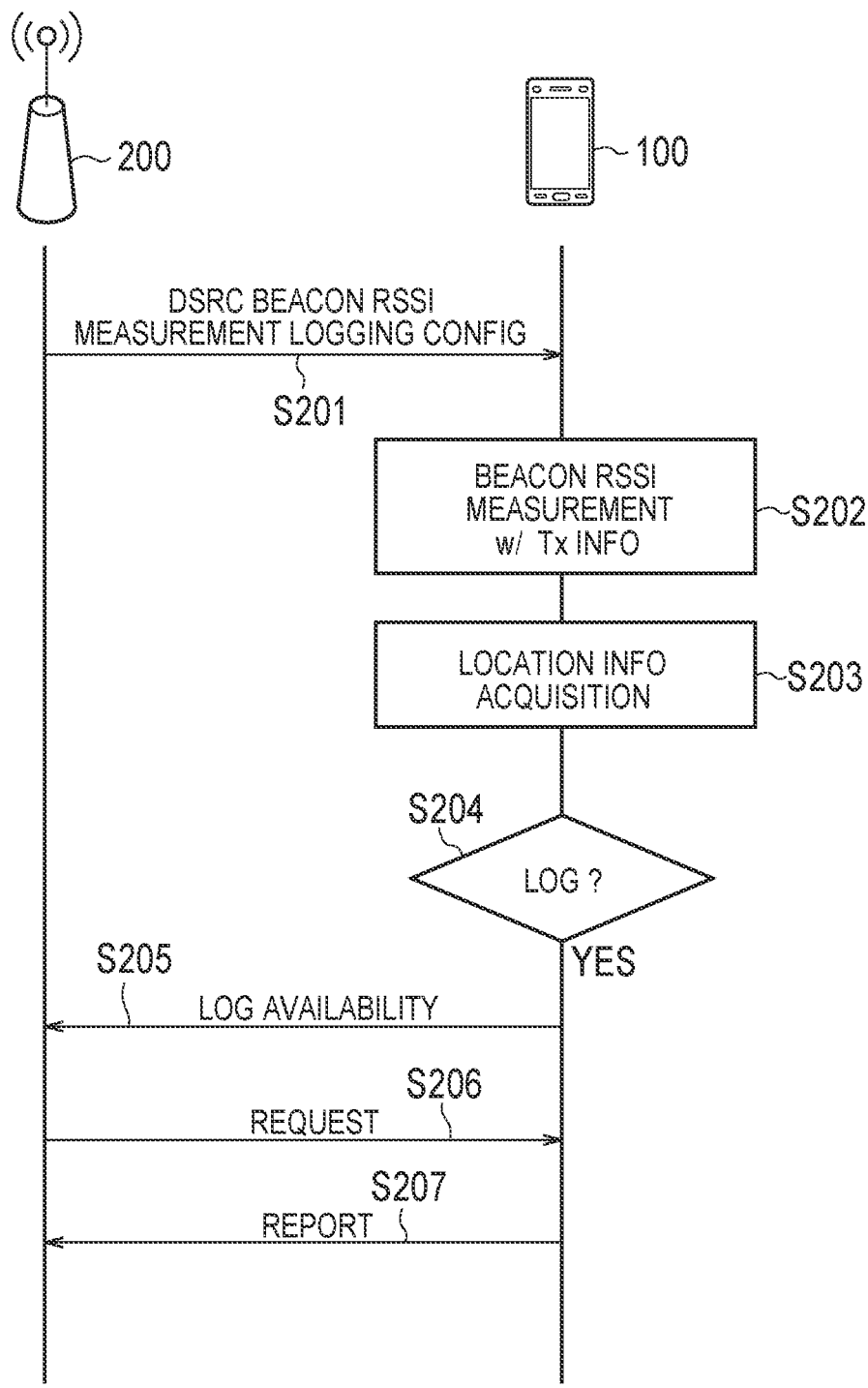

RADIO TERMINAL AND PROCESSOR

CROSS-REFERENCE TO RELATED APPLICATION

The present application is a continuation based on PCT Application No. PCT/JP2017/001799 filed on Jan. 19, 2017, which claims the priority of U.S. Provisional Application No. 62/281,848 (filed on Jan. 22, 2016). The content of which is incorporated by reference herein in their entirety.

FIELD

The present invention relates to a radio terminal and a processor used in a mobile communication system.

BACKGROUND

In 3GPP (Third Generation Partnership Project) which is a project aiming to standardize a mobile communication system, an MDT (Minimization of Drive Tests) function has been specified. MDT is primarily a function to optimize a network by measuring a radio environment by the radio terminal and reporting a measurement result together with location information to the network.

Further, in the 3GPP, in order to meet rapidly increasing traffic demands, attempts to improve LTE (Long Term Evolution) are undergoing. As one of such attempts, it has been discussed to use, for LTE communication, not only a licensed frequency band that is a frequency band for which a license is granted to an operator, but also an unlicensed frequency band that is a frequency band for which a license is not required. The unlicensed frequency band may be referred to as "unlicensed spectrum".

SUMMARY

A radio terminal according to one embodiment supports MDT. The radio terminal comprises: a receiver configured to receive configuration information from a network, the configuration information setting an RSSI measurement in an unlicensed frequency band and an acquisition of location information of the radio terminal; a controller configured to perform the RSSI measurement and the acquisition of the location information, based on the configuration information; and a transmitter configured to transmit an RSSI measurement result together with the location information, to the network.

A processor according to one embodiment controls a radio terminal configured to support MDT. Thee processor is configured to execute processes of: receiving configuration information from a network, the configuration information setting an RSSI measurement in an unlicensed frequency band and an acquisition of location information of the radio terminal; performing the RSSI measurement and the acquisition of the location information based on the configuration information; and transmitting an RSSI measurement result together with the location information, to the network.

BRIEF DESCRIPTION OF THE DRAWINGS

FIG. 9 is a chart illustrating a sequence of a use case 2 according to the embodiment.

DESCRIPTION OF THE EMBODIMENT

Overview of the Embodiments

Figure 1:
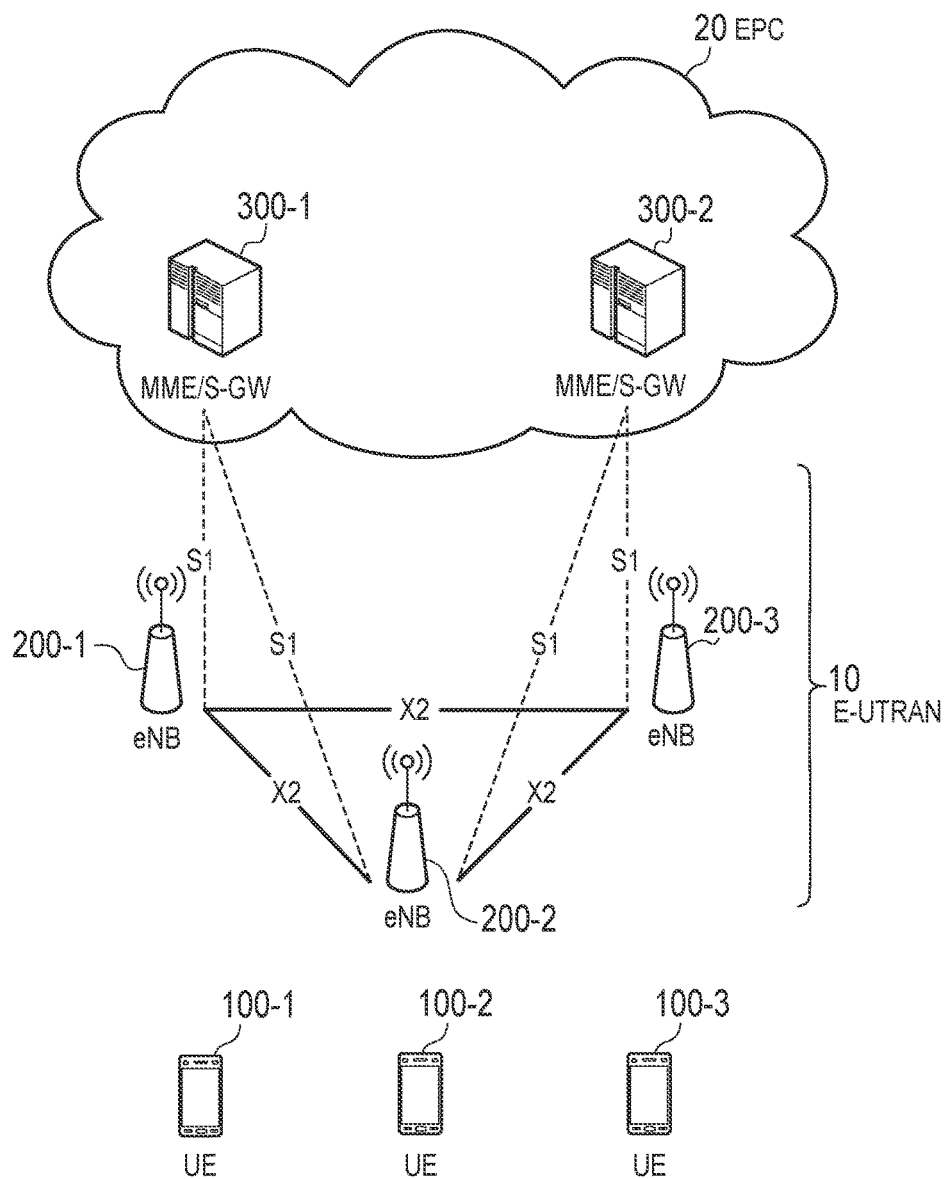
FIG. 1 is a diagram illustrating a configuration of an LTE system.

A radio terminal according to one embodiment supports MDT. The radio terminal comprises: a receiver configured to receive configuration information from a network, the configuration information setting an RSSI measurement in an unlicensed frequency band and an acquisition of location information of the radio terminal; a controller configured to perform the RSSI measurement and the acquisition of the location information, based on the configuration information; and a transmitter configured to transmit an RSSI measurement result together with the location information, to the network.

In the embodiment, the configuration information includes information indicating an RSSI measurement window. The controller is further configured to calculate an average RSSI being an average of a plurality of RSSI measurement values within the RSSI measurement window. The RSSI measurement result includes the average RSSI.

In the embodiment, the controller is further configured to compare each of the plurality of RSSI measurement values to a threshold value and calculate a proportion of an RSSI measurement value greater than the threshold value relative to plurality of the RSSI measurement values. The transmitter is further configured to transmit the proportion along with the RSSI measurement result.

In the embodiment, the controller is further configured to perform a reception process of a radio signal detected in the unlicensed frequency band and generate auxiliary information based on a content of the radio signal. The transmitter is further configured to transmit the auxiliary information together with the RSSI measurement result.

In the embodiment, the unlicensed frequency band includes a plurality of subfrequency bands. The configuration information includes frequency information specifying a subfrequency band to be measured, out of the plurality of subfrequency bands.

In the embodiment, the MDT is an Immediate MDT. The transmitter is further configured to transmit a measurement report including the RSSI measurement result and the location information, to the network.

In the embodiment, the MDT is a Logged MDT. The controller is configured to store a measurement log including the RSSI measurement result, the location information, and a time stamp. The transmitter is further configured to: transmit a notification indicating that the radio terminal has the measurement log, to the network at a predetermined timing, and transmit the measurement log to the network if the radio terminal receives a transmission request from the network.

In the embodiment, the controller comprises an AS entity configured to execute the Logged MDT. A higher layer entity located in a higher layer than the AS entity and configured to store higher layer data different from the measurement log. The AS entity is further configured to execute the Logged MDT coordinated with the higher layer entity.

In the embodiment, the AS entity is configured to share a timer for obtaining the time stamp with the higher layer entity. The higher layer entity is further configured to add the time stamp to the higher layer data by using the timer.

In the embodiment, the AS entity is configured to store the measurement log, upon a notification from the higher layer entity as a trigger.

A processor according to one embodiment controls a radio terminal configured to support MDT. The processor is configured to execute processes of: receiving configuration information from a network, the configuration information setting an RSSI measurement in an unlicensed frequency band and an acquisition of location information of the radio terminal; performing the RSSI measurement and the acquisition of the location information based on the configuration information; and transmitting an RSSI measurement result together with the location information, to the network.

Embodiments (1) Configuration of System

An LTE system, which is a mobile communication system according to an embodiment will be described below. FIG. 1 is a diagram showing a configuration of the LTE system.

As shown in FIG. 1, the LTE system includes a UE (User Equipment) 100, an E-UTRAN (Evolved Universal Terrestrial Radio Access Network) 10, and an EPC (Evolved Packet Core) 20. The E-UTRAN 10 and the EPC 20 constitute the network of the LTE system.

The UE 100 corresponds to a radio terminal. The UE 100 is a mobile radio terminal. The UE 100 performs radio communication with a cell (serving cell). The configuration of the UE 100 will be described later.

The E-UTRAN 10 corresponds to a radio access network. The E-UTRAN 10 includes an eNB 200 (evolved Node-B). The eNB 200 corresponds to a base station. The eNB 200 is connected mutually via an X2 interface. The configuration of the eNB 200 will be described later.

The eNB 200 manages one cell or a plurality of cells. The eNB 200 performs radio communication with the UE 100 that has established a connection with a cell of the eNB 200. The eNB 200 has a radio resource management (RRM) function, a routing function of user data (hereinafter, simply called the "data"), a measurement control function for mobility control and scheduling, and the like. "Cell" is used as a term indicating the smallest unit of a radio communication area. "Cell" is also used as a term indicating a function of performing radio communication with the UE 100.

The EPC 20 corresponds to a core network. The EPC 20 includes an MME (Mobility Management Entity)/S-GW (Serving-Gateway) 300. The MME performs different types of mobility control and the like for the UE 100. The S-GW performs transfer control of the data. The MME/S-GW 300 is connected to the eNB 200 via an S1 interface. The E-UTRAN 10 and the EPC 20 constitute a network. The P-GW 350 performs control to relay user data from an external network (and to an external network).

Figure 2:
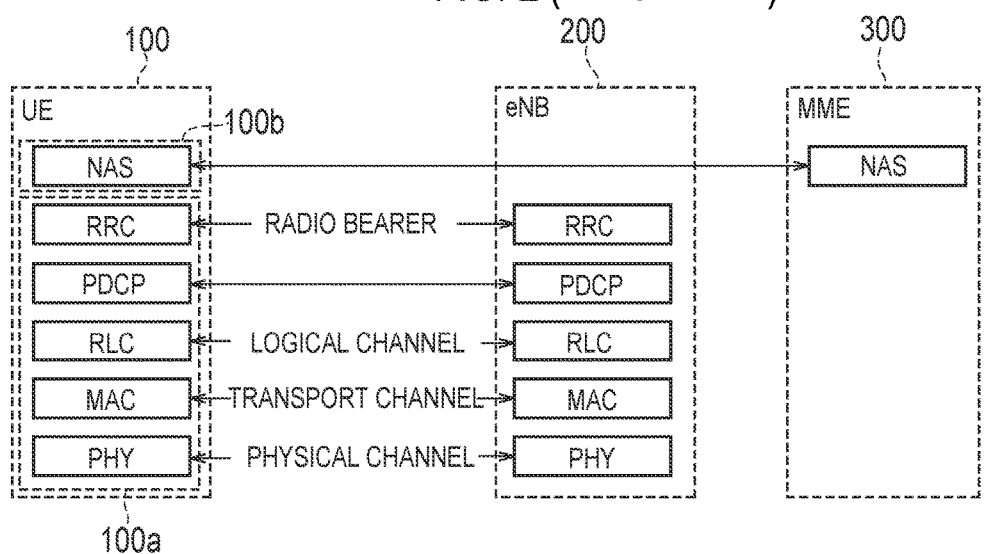
FIG. 2 is a protocol stack diagram of a radio interface in the LTE system.

FIG. 2 is a protocol stack diagram of a radio interface in the LTE system. As shown in FIG. 2, the radio interface protocol is classified into a first layer to a third layer of an OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer, the MAC layer, the RLC layer, the PDCP layer, and the RRC layer constitute an AS (Access Stratum) entity 100a. An upper layer entity 100b is positioned higher than the AS entity 100a. The upper layer entity 100b includes an NAS (Non-Access Stratum) layer. The upper layer entity 100b may further include an application layer or the like.

The physical layer performs coding and decoding, modulation and demodulation, antenna mapping and demapping, and resource mapping and demapping. Between the physical layer of the UE 100 and the physical layer of the eNB 200, data and control signals are sent via a physical channel.

The MAC layer performs priority control of data, a retransmission process by a hybrid ARQ (HARQ: Hybrid Automatic Repeat Request), a random access procedure, and the like. Between the MAC layer of the UE 100 and the MAC layer of the eNB 200, data and control signals are sent via a transport channel. The MAC layer of the eNB 200 includes a scheduler. The scheduler decides a transport format (a transport block size and a modulation and coding scheme (MCS)) of an uplink and a downlink, and a resource block to be assigned to the UE 100.

The RLC layer sends data to an RLC layer of a reception side by using the functions of the MAC layer and the physical layer. Between the RLC layer of the UE 100 and the RLC layer of the eNB 200, data and control signals are sent via a logical channel.

The PDCP layer performs header compression and decompression, and encryption and decryption.

The RRC layer is defined only in a control plane that handles control signals. Between the RRC layer of the UE 100 and the RRC layer of the eNB 200, a message (RRC message) for various types of settings is sent. The RRC layer controls a logical channel, a transport channel, and a physical channel depending on the establishment, re-establishment, and release of a radio bearer. When a connection (RRC connection) is established between the RRC of the UE 100 and the RRC of the eNB 200, the UE 100 is in an RRC connected mode. When the connection (RRC connection) is not established between the RRC of the UE 100 and the RRC of the eNB 200, the UE 100 is in an RRC idle mode.

An NAS (Non-Access Stratum) layer positioned above the RRC layer performs session management, mobility management and the like.

Figure 3:
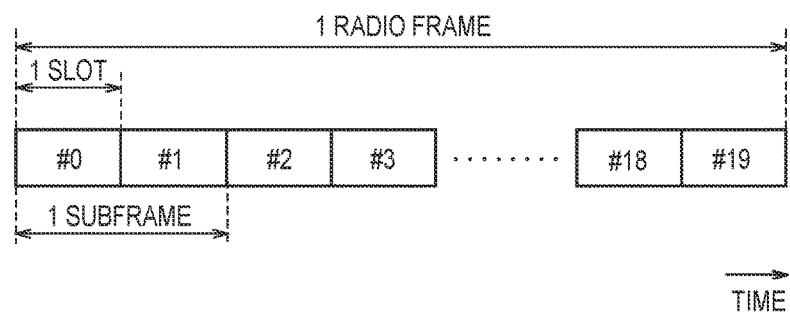
FIG. 3 is a diagram illustrating a configuration of a radio frame used in the LTE system.

FIG. 3 is a configuration diagram of a radio frame used in the LTE system. In the LTE system, OFDMA (Orthogonal Frequency Division Multiple Access) is applied to a downlink. In the LTE system, SC-FDMA (Single Carrier Frequency Division Multiple Access) is applied to an uplink.

As shown in FIG. 3, a radio frame is configured by 10 subframes arranged in a time direction. Each subframe is configured by two slots arranged in the time direction. The length of each subframe is 1 ms. The length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is configured by one symbol and one subcarrier. Further, of the radio resources (time-frequency resources) allocated to the UE 100, it is possible to designate a frequency resource by a resource block, and designate a time resource by a subframe (or a slot).

(2) Configuration of Radio Terminal

Figure 4:
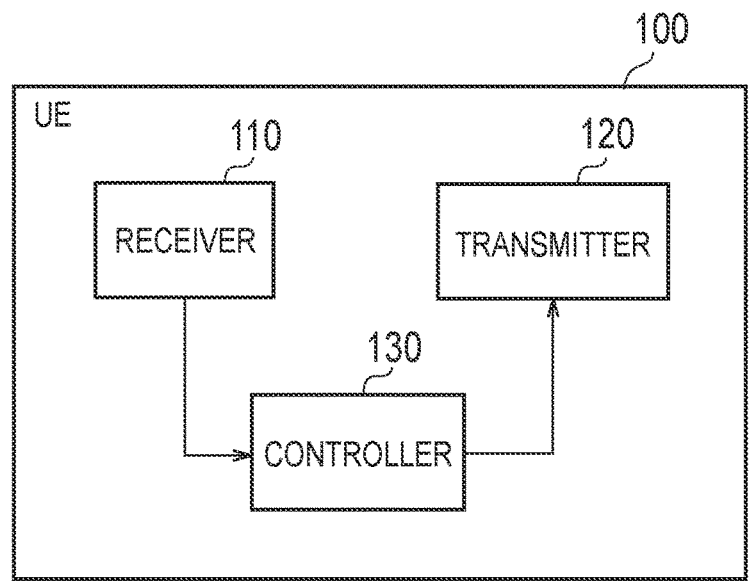
FIG. 4 is a diagram illustrating a configuration of a UE.

A UE 100 (radio terminal) according to the embodiment will be described below. FIG. 4 is a diagram showing the configuration of the UE 100.

As shown in FIG. 4, the UE 100 includes a receiver 110, a transmitter 120, and a controller 130. The UE 100 may further include a Global Navigation Satellite System (GNSS) receiver.

The receiver 110 performs various types of reception under the control of the controller 130. The receiver 110 includes antennas and a receiving machine. The receiving machine converts a radio signal received by the antennas into a baseband signal (received signal). The receiving machine outputs the baseband signal to the controller 130. The receiver 110 may include a first receiving machine and a second receiving machine. The first receiving machine receives the radio signal in the licensed frequency band. The second receiving machine receives the radio signal in the unlicensed frequency band.

The transmitter 120 performs various transmissions under the control of the controller 130. The transmitter 120 includes antennas and a transmitting machine. The transmitting machine converts the baseband signal (transmission signal) output from the controller 130 into a wireless signal. The transmitting machine transmits a radio signal from the antennas. The transmitter 120 may include a first transmitting machine and a second transmitting machine. The first transmitting machine transmits a radio signal in the licensed frequency band. The second transmitting machine transmits a radio signal in the unlicensed frequency band.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs modulation and demodulation, encoding and decoding and the like of a baseband signal. The CPU performs various processes by executing the program stored in the memory. The processor may include a codec. The codec performs encoding and decoding on sound and video signals. The processor executes various types of processes described later, and various types of communication protocols described above.

(3) Configuration of Base Station

Figure 5:
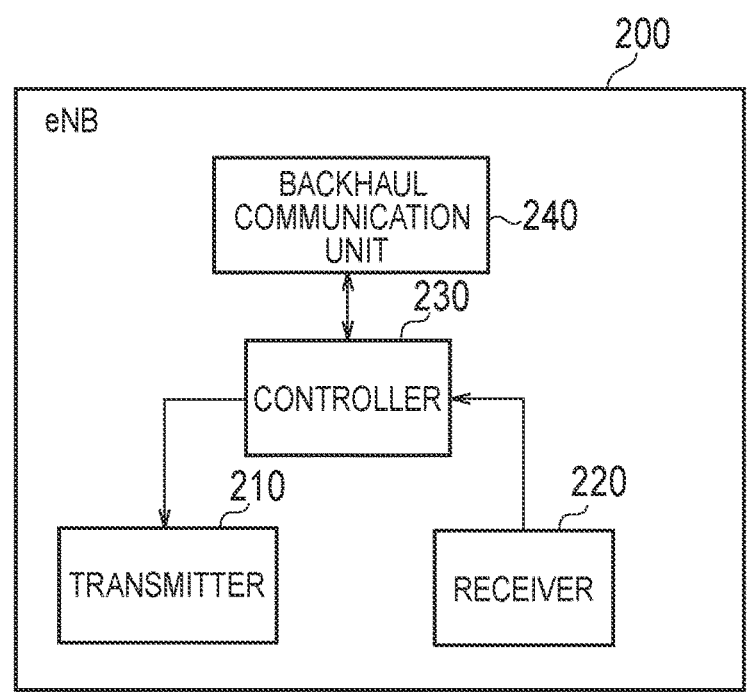
FIG. 5 is a diagram illustrating a configuration of an eNB.

An eNB 200 (base station) according to the embodiment will be described below. FIG. 5 is a block diagram of the eNB 200.

As shown in FIG. 5, the eNB 200 includes a receiver 210, a transmitter 220, a controller 230, and a backhaul communication unit 240.

The transmitter 210 performs various transmissions under the control of the controller 230. The transmitter 210 includes antennas and a transmitting machine. The transmitting machine converts the baseband signal (transmission signal) output from the controller 230 into a radio signal. The transmitting machine transmits the radio signal from the antennas. The transmitter 210 may include a first transmitting machine and a second transmitting machine. The first transmitting machine transmits a radio signal in the licensed frequency band. The second transmitting machine transmits a radio signal in the unlicensed frequency band.

The receiver 220 performs various types of reception under the control of the controller 230. The receiver 220 includes antennas and a receiving machine. The receiving machine converts a radio signal received by the antennas into a baseband signal (received signal). The receiving machine outputs the baseband signal to the controller 230. The receiver 220 may include a first receiving machine and a second receiving machine. The first receiving machine receives the radio signal in the licensed frequency band. The second receiving machine receives the radio signal in the unlicensed frequency band.

The controller 230 performs various types of controls in the eNB 200. The controller 230 includes a processor and a memory. The memory stores a program to be executed by the processor, and information to be used for a process by the processor. The processor includes a baseband processor and a CPU (Central Processing Unit). The baseband processor performs modulation and demodulation, encoding and decoding and the like of a baseband signal. The CPU performs various processes by executing the program stored in the memory. The processor executes various types of processes described later, and various types of communication protocols described above.

The backhaul communication unit 240 is connected to a neighboring eNB 200 via the X2 interface. The backhaul communication unit 240 is connected to the MME/S-GW 300 via the S1 interface. The network interface 240 is used in communication performed on the X2 interface, communication performed on the S1 interface, and the like.

(4) LAA

An LAA (Licensed-Assisted Access) will be described, below.

An LTE system according to the embodiment uses not only the licensed frequency band, but also the unlicensed frequency band for the LTE communication. The LAA is a function of allowing for an access to the unlicensed frequency band, with an aid of the licensed frequency band.

Figure 6:
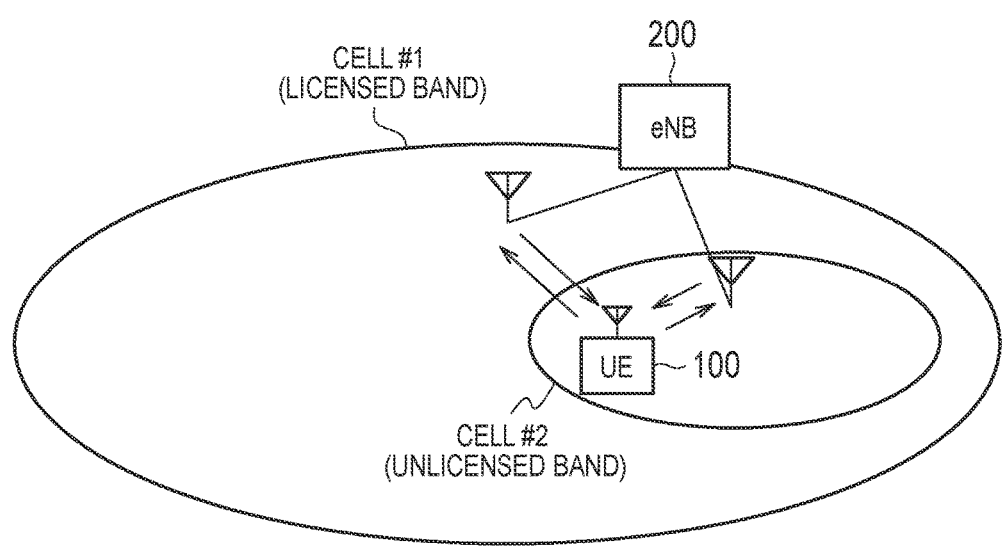
FIG. 6 is a diagram illustrating an example of an LAA.

FIG. 6 is a diagram illustrating an example of the LAA. As illustrated in FIG. 6, the eNB 200 manages a cell #1 and a cell #2. The cell #1 is operated in the licensed frequency band. The cell #2 is operated in the unlicensed frequency band. In FIG. 6, an example is illustrated where the cell #1 is a macro cell and the cell #2 is a small cell. However, a cell size is not limited thereto.

The UE 100 is located in an overlapping area of the cell #1 and the cell #2. The UE 100 sets the cell #1 as a primary cell (PCell), while setting the cell #2 as a secondary cell (SCell) and performs communication by carrier aggregation (CA). Such a carrier aggregation provides the UE 100 with a radio resource of the unlicensed frequency band in addition to a radio resource of the licensed frequency band.

(5) Operation According to Embodiment

An operation according to the embodiment will be described, below.

The UE 100 according to the embodiment supports MDT. The UE 100 according to the embodiment has a function of receiving a radio signal transmitted in the unlicensed frequency band. The unlicensed frequency band is shared by a plurality of systems. The plurality of systems include the LTE system, a WLAN (Wireless LAN) system, a DSRC (Dedicated Short Range Communication) system, and the like.

The unlicensed frequency band is a 5 GHz band and a 5.9 GHz band, or the like. For example, the LTE system and the WLAN (Wireless LAN) system mainly use the 5 GHz band among the unlicensed frequency bands. The DSRC system uses the 5.9 GHz band.

The receiver 110 of the UE 100 receives configuration information from the network (the eNB 200). The configuration information sets an RSSI (Received Signal Strength Indicator) measurement in the unlicensed frequency band and acquisition of location information of the UE 100. The location information is information for specifying a geographic location of the UE 100. The location information is, for example, GNSS location information or an RF (Radio Frequency) fingerprint. The configuration information is transmitted and received by an RRC signaling, for example.

Based on the configuration information, the controller 130 of the UE 100 performs the RSSI measurement in the unlicensed frequency band and the acquisition of the location information. The transmitter 120 of the UE 100 transmits an RSSI measurement result, along with the location information, to the network (the eNB 200). The RSSI measurement result is transmitted and received by the RRC signaling, for example.

The configuration information may include information indicating an RSSI measurement window. A time length of the RSSI measurement window is longer than an RSSI measurement interval. The controller 130 calculates an average RSSI that is an average of a plurality of RSSI measurement values within the RSSI measurement window. The transmitter 120 transmits the average RSSI, as the RSSI measurement result, to the network (the eNB 200). By reporting such an average RSSI, an influence of an instantaneous RSSI fluctuation can be reduced, and a long-term communication quality of the unlicensed frequency band can be grasped.

The controller 130 may compare each of the plurality of RSSI measurement values to a threshold value to calculate a proportion of an RSSI measurement value greater than the threshold value, relative to the plurality of the RSSI measurement values. The threshold value may be included in the configuration information. Such a proportion can be an indicator indicating how frequently the unlicensed frequency band is utilized. Hereinafter, such a proportion is referred to as "channel utilization rate". The transmitter 120 transmits the RSSI measurement result (the average RSSI), along with the channel utilization rate, to the network (the eNB 200).

The controller 130 may perform a reception process (signal detection) of a radio signal detected in the unlicensed frequency band and may generate auxiliary information based on a content of the radio signal. The transmitter 120 further transmits the auxiliary information along with the RSSI measurement result. By also reporting the auxiliary information, it is possible for the network to make a more detailed comprehension of a condition of the unlicensed frequency band.

The radio signal to be detected is, for example, a WLAN beacon signal, an LTE broadcast signal, or an DSRC signal and the like. The LTE broadcast signal is a reference signal or system information and the like.

The auxiliary information is at least one of a transmission source node identifier of the received radio signal, a kind (type) of the transmission source node, a received signal strength/received signal quality of the received radio signal, the number of nodes that can be specified, and load information of the transmission source node. Here, the transmission source node identifier is a WLAN identifier or a cell identifier, for example. The WLAN identifier is a BSSID (Basic Service Set IDentification) and the like. The cell identifier is a physical cell ID or a global cell ID. The transmission source node identifier may be a ProSe UE ID used in a proximity-based service (ProSe). The received signal strength/received signal quality of the received radio signal is different from the RSSI that is an overall received signal strength of a certain frequency band. The received signal strength/received signal quality of the received radio signal is a received signal strength/received signal quality of a specific radio signal. For example, the received signal strength/received signal quality is a reference signal received power (RSRP), a reference signal received quality (RSRQ), or a beacon RSSI, and the like. The load information of the transmission source node is, for example, a backhaul rate (a WLAN backhaul rate and the like).

The configuration information may include frequency information for specifying a subfrequency band to be measured among a plurality of subfrequency bands included in the unlicensed frequency band. The subfrequency band is, for example, a WLAN band or a WLAN channel. The controller 130 measures the RSSI of a band or a channel specified by the frequency information (band number or channel number).

(5.1) Use Case 1

A use case 1 of the MDT involving the RSSI measurement in the unlicensed frequency band will be described, below. In the use case 1, an Immediate MDT is assumed.

Figure 7:
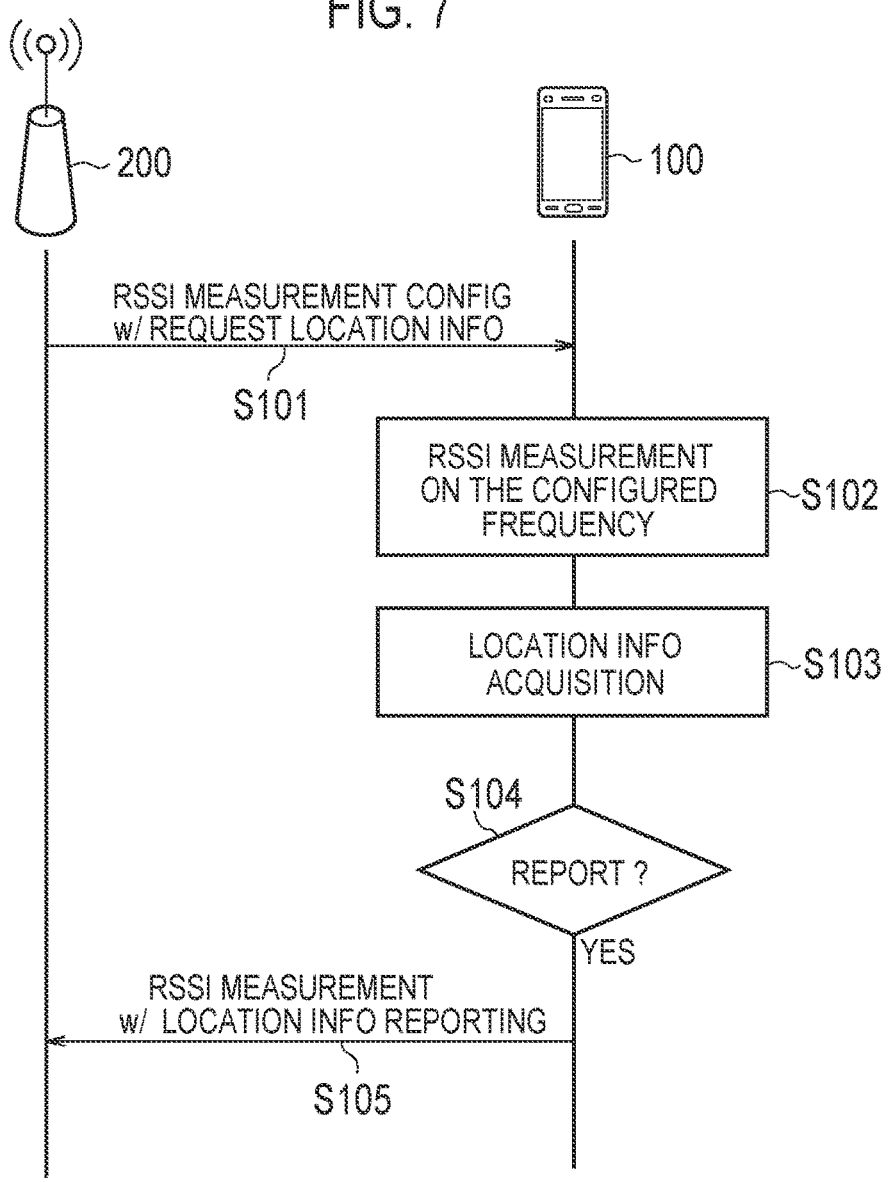
FIG. 7 is a chart illustrating a sequence of a use case 1 according to an embodiment.

FIG. 7 is a chart illustrating a sequence of the use case 1.

As illustrated in FIG. 7, in step S101, the eNB 200 transmits the configuration information (RSSI measurement config) to the UE 100.

The configuration information sets the RSSI measurement in the unlicensed frequency band and the acquisition of the location information of the UE 100. The UE 100 receives the configuration information.

The configuration information includes information for requesting the acquisition of the location information of the UE 100 (request location info). The configuration information may include timing information for specifying a report timing. The timing information includes information for specifying one of a periodic reporting and an event-triggered reporting. For the periodic reporting, the timing information may include information for specifying a period of a measurement report. For the event-triggered reporting, the timing information may include information for specifying a type (event) of a trigger.

In step S102, the UE 100 performs, in the RRC connected mode, the RSSI measurement (RSSI measurement) in the unlicensed frequency band. If the configuration information includes the frequency information, the UE 100 performs the RSSI measurement on a specified frequency band (configured frequency).

For the periodic reporting, the UE 100 starts a process for reporting the RSSI measurement result to the serving cell at a timing when the physical layer reports the first RSSI sample value. This process is performed in the RRC layer of the UE 100.

For the event-triggered reporting (Event triggered Reporting), the UE 100 starts the process for reporting the RSSI measurement result to the serving cell at the timing when the physical layer reports the first RSSI sample value. At a timing when the RSSI value averaged over a report interval (Report Interval) exceeds a threshold value, the UE 100 reports the RSSI measurement result to the serving cell. This process is performed in the RRC layer of the UE 100.

Thus, the RRC layer does not necessarily start the measurement report immediately after the RRC measurement is set, but starts the measurement report after the physical layer has started the RSSI measurement.

In step S103, the UE 100 acquires the location information (location info). The order of step S102 and step S103 may be reverse.

In step S104, the UE 100 determines whether or not the present timing is a measurement report timing.

In step S105, if the present timing is the measurement report timing, the UE 100 transmits the measurement report including the RSSI measurement result and the location information to eNB 200. The measurement report may include the channel utilization rate and/or the auxiliary information described above. The eNB 200 receives the measurement report.

Thus, in the use case 1, the eNB 200 receives, from the UE 100 in the RRC connected mode in the cell of the eNB 200, the measurement report including the RSSI measurement result and the location information.

Figure 8:
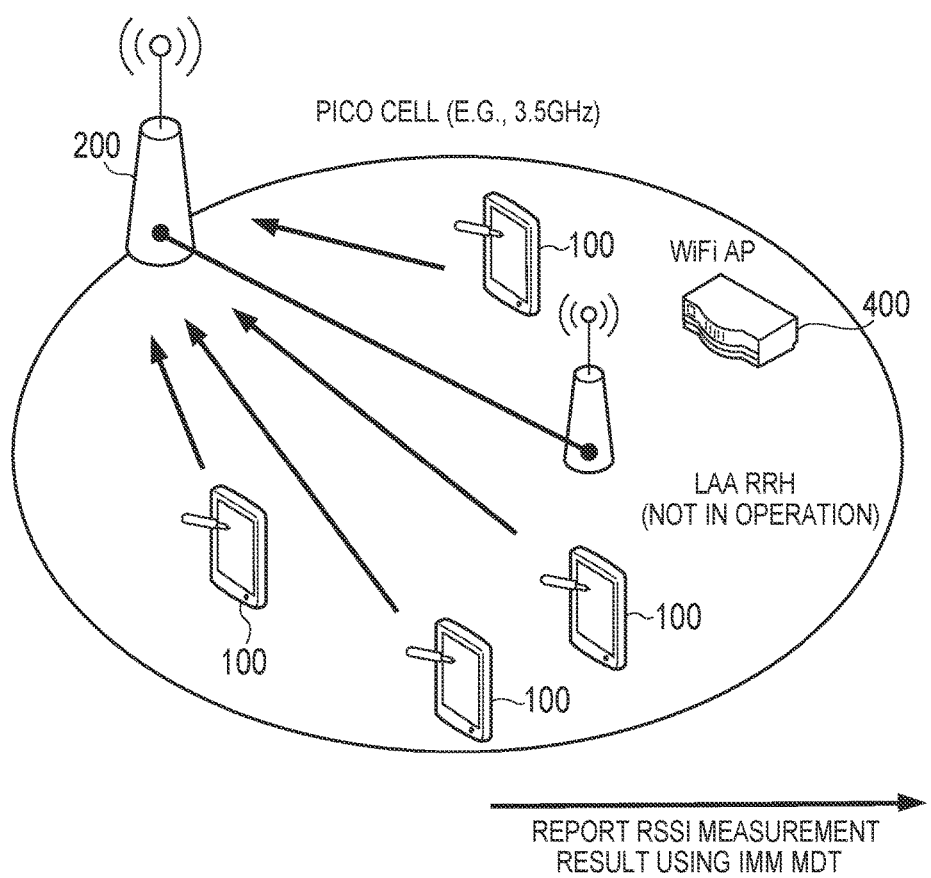
FIG. 8 is a diagram illustrating a specific example of the use case 1 according to the embodiment.

FIG. 8 is a diagram illustrating a specific example of the use case 1.

As illustrated in FIG. 8, the eNB 200 manages a cell operated in a 3.5 GHz band in the licensed frequency band (Pico Cell). Further, the eNB 200 has an RRH (Remote Radio Head) operated in the unlicensed frequency band. The RRH is a remote radio unit used in the LAA (LAA RRH). In the vicinity of the RRH, a WLAN access point (WiFi AP) 400 is arranged.

In this operation environment, the eNB 200 uses the Immediate MDT (IMM MDT) to receive the measurement report including the RSSI measurement result (RSSI measurement result) and the location information and the like from each UE 100 in the cell of the eNB 200.

The eNB 200 specifies the UE 100 located in the vicinity of the RRH, based on the location information. The eNB 200 verifies the RSSI measurement result and the like of the specified UE 100, and determines whether or not the unlicensed frequency band is available. If determining that the unlicensed frequency band is unavailable, the eNB 200 stops the operation of the RRH. If determining that the unlicensed frequency band is available, the eNB 200 continues or restarts the operation of the RRH. Thus, it is possible to properly operate the RRH.

(5.2) Use Case 2

A use case 2 of the MDT involving the RSSI measurement in the unlicensed frequency band will be described, below. In the use case 2, a Logged MDT is assumed. It is noted that the Logged MDT may be "Logged MDT in Idle" in which the UE 100 in the RRC idle mode performs logging. The Logged MDT may be "Logged MDT in Connected" in which the UE 100 in the RRC connected mode performs logging. The logging is a series of processes including measurement and storage of the measurement result.

In the use case 2, a case is assumed where the UE 100 detects a DSRC signal (DSRC beacon). The UE 100 may be a vehicle-mountable UE (onboard terminal) mounted on a vehicle.

FIG. 9 is a chart illustrating a sequence of the use case 2.

As illustrated in FIG. 9, in step S201, the eNB 200 transmits configuration information (DSRC Beacon RSSI measurement logging config) to the UE 100. The configuration information sets the RSSI measurement in the unlicensed frequency band and the acquisition of the location information of the UE 100. The UE 100 receives the configuration information. The configuration information includes a network absolute time that is a basis for a time stamp and a logging period that is a duration during which logging is to be performed, and the like.

In step S202, the UE 100 performs, in the RRC idle mode or the RRC connected mode, the RSSI measurement (RSSI measurement) in the unlicensed frequency band. If being able to detect the DSRC beacon, the UE 100 performs measurement of the beacon RSSI (Beacon RSSI measurement). The UE 100 generates the auxiliary information based on the detected DSRC beacon. The auxiliary information includes transmission source node information of the DSRC beacon (Tx info). If location information of the transmission source node is included in the DSRC beacon, the UE 100 may include the location information of the transmission source node into the auxiliary information.

In step S203, the UE 100 acquires the location information (location info). The order of step S202 and step S203 may be reverse.

The UE 100 stores a measurement log including the RSSI measurement result, the location information, the auxiliary information, and the time stamp. The UE 100 has a timer and uses the timer to measure an elapsed time from the network absolute time. The UE 100 includes a timer value during the measurement as the time stamp, into the measurement log. The AS entity 100a of the UE 100 continues the logging until the logging period ends.

The higher layer entity 100b of the UE 100 stores higher layer data different from the measurement log stored by the AS entity 100a. For example, if the higher layer entity 100b executes an application for a vehicle, the higher layer data is data associated with the vehicle. The higher layer data may be image data obtained by a vehicle-mountable camera.

It is preferable that the AS entity 100a of the UE 100 executes logging coordinated with the higher layer entity 100b.

For example, the AS entity 100a shares a timer for obtaining the time stamp with the higher layer entity 100b. The higher layer entity 100b adds the time stamp to the higher layer data by using the timer shared with the AS entity 100a. Thus, when the network has acquired the measurement log and the higher layer data, the network can associate the measurement log and the higher layer data by using the time stamp.

The AS entity 100a may store the measurement log, in response to a notification from the higher layer entity 100b as a trigger. For example, the higher layer entity 100b informs the AS entity 100a when sensing a danger by the vehicle-mountable camera. Thus, the AS entity 100a can perform logging in response to generation, as a trigger, an event associated with the vehicle.

In step S204, after the end of the logging period, if having the measurement log (step S204: Yes), in step S205, the UE 100 transmits a notification indicating that the UE 100 includes the measurement log (Log availability) to the eNB 200 at a predetermined timing. The predetermined timing is, for example, a timing when the UE 100 performs a handover, or a timing when the UE 100 transitions from the RRC idle mode to the RRC connected mode. The predetermined timing may be a time point or a time period specified by the configuration information. For example, it is conceivable to specify a time point or a time period late at night when a traffic amount is low.

Based on the notification from the UE 100, the eNB 200 determines whether or not to acquire the measurement log. Here, description proceeds under the assumption that the eNB 200 determines to acquire the measurement log.

In step S206, the eNB 200 transmits, to the UE 100, a transmission request (Request) for requesting transmission of the measurement log.

In step S207, in response to reception of the transmission request from the eNB 200, the UE 100 transmits (reports) the measurement log to the network. The UE 100 transmits, along with the measurement log, the higher layer data to the eNB 200. Alternatively, the UE 100 may transmit the higher layer data to the eNB 200 at a different timing from the measurement log.

Thus, in the use case 2, the network acquires the measurement log and the higher layer data from the UE 100.

Figure 10A:
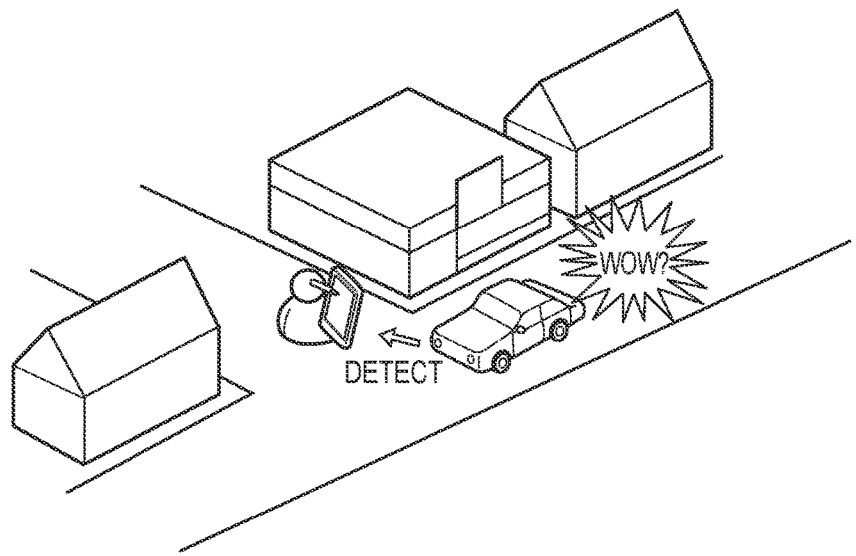
FIGS. 10A and 10B are diagrams illustrating a specific example of the use case 2 according to the embodiment.
Figure 10B:
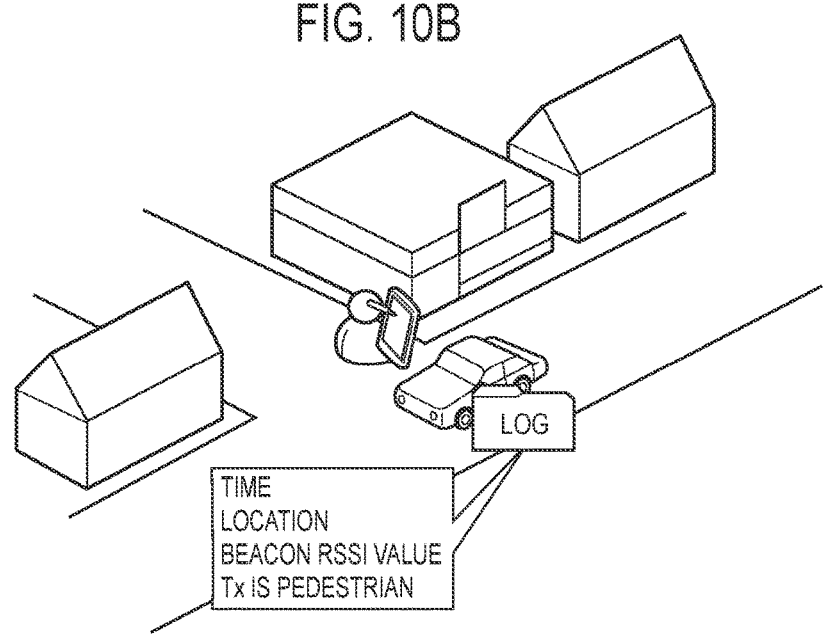

FIGS. 10A and 10B are diagrams illustrating a specific example of the use case 2.

As illustrated in FIG. 10A, the vehicle (automobile) mounted with the UE 100 is driving on a roadway. The UE 100 detects (Detect) a DSRC beacon transmitted from a communication node carried by a pedestrian. Alternatively, the UE 100 may detect the pedestrian by the vehicle-mountable camera. As illustrated in FIG. 10B, the UE 100 stores the measurement log when detecting the pedestrian. The measurement log includes, for example, the time stamp (Time), the location information (Location), the beacon RSSI (Beacon RSSI value), and information about the transmission source node (Tx is pedestrian). Thus, a situation when a danger occurs can be recorded as the measurement log. Further, the higher layer data and the measurement log may be combined to grasp a detailed situation when danger occurs.

Other Embodiments

In the above-described embodiment, the LTE system is exemplified as the mobile communication system. However, the present invention is not limited to the LTE system. The present invention may be applied to systems other than the LTE system.

INDUSTRIAL APPLICABILITY

The present invention is useful in the field of communication.

The invention claimed is:

1. A radio terminal that supports MDT (Minimization of Drive Tests), comprising:
a receiver configured to receive configuration information from a network, the configuration information configuring the radio terminal to perform an RSSI (Received Signal Strength Indicator) measurement in an unlicensed frequency band and an acquisition of location information of the radio terminal;
a controller configured to perform the RSSI measurement and the acquisition of the location information, based on the configuration information; and
a transmitter configured to transmit an RSSI measurement result corresponding to result of the RSSI measurement together with the location information, to the network,
the controller is further configured to perform a reception process of a radio signal detected in the unlicensed frequency band and generate auxiliary information based on a content of the radio signal, and
the transmitter is further configured to transmit the auxiliary information together with the RSSI measurement result,
the unlicensed frequency band includes frequency band of DSRC (Dedicated Short Range Communication),
the configuration information further configures the user terminal to perform measurement for RSSI of beacon of the DSRC,
the RSSI measurement result includes measurement result corresponding to the measurement for the RSSI, and
the auxiliary information includes information about transmission source transmitting the beacon.

2. The radio terminal according to claim 1, wherein the configuration information includes information indicating an RSSI measurement window,
the controller is further configured to calculate an average RSSI being an average of a plurality of RSSI measurement values within the RSSI measurement window, and
the RSSI measurement result includes the average RSSI.

3. The radio terminal according to claim 1, wherein the controller is further configured to compare each of the plurality of RSSI measurement values to a threshold value and calculate a proportion of an RSSI measurement value greater than the threshold value relative to plurality of the RSSI measurement values, and
the transmitter is further configured to transmit the proportion along with the RSSI measurement result.

4. The radio terminal according to claim 1, wherein the unlicensed frequency band includes a plurality of subfrequency bands, and
the configuration information includes frequency information specifying a subfrequency band to be measured, out of the plurality of subfrequency bands.

5. The radio terminal according to claim 1, wherein the MDT is an Immediate MDT, and
the transmitter is further configured to transmit a measurement report including the RSSI measurement result and the location information, to the network.

6. The radio terminal according to claim 1, wherein the MDT is a Logged MDT,
the controller is configured to store a measurement log including the RSSI measurement result, the location information, and a time stamp,
the transmitter is further configured to:
transmit a notification indicating that the radio terminal has the measurement log, to the network at a predetermined timing, and
transmit the measurement log to the network if the radio terminal receives a transmission request from the network.

7. The radio terminal according to claim 6, wherein the controller comprises:
an AS (Access Stratum) entity configured to execute the Logged MDT, the AS entity located in an AS layer; and
a higher layer entity located in a layer higher than the AS layer and configured to store higher layer data different from the measurement log, wherein
the AS entity is further configured to execute the Logged MDT coordinated with the higher layer entity.

8. The radio terminal according to claim 7, wherein the AS entity is configured to share a timer for obtaining the time stamp with the higher layer entity, and
the higher layer entity is further configured to add the time stamp to the higher layer data by using the timer.

9. The radio terminal according to claim 7, wherein the AS entity is configured to store the measurement log, upon a notification from the higher layer entity as a trigger.

10. A processor configured to control a radio terminal configured to support MDT (Minimization of Drive Tests), wherein the processor is configured to execute processes of:
receiving configuration information from a network, the configuration information for configuring the radio terminal to perform an RSSI (Received Signal Strength Indicator) measurement in an unlicensed frequency band and an acquisition of location information of the radio terminal;
performing the RSSI measurement and the acquisition of the location information based on the configuration information;

transmitting an RSSI measurement result corresponding to result of the RSSI measurement together with the location information, to the network;

performing a reception process of a radio signal detected in the unlicensed frequency band and generate auxiliary information based on a content of the radio signal; and transmitting the auxiliary information together with the RSSI measurement result, wherein the unlicensed frequency band includes frequency band of DSRC (Dedicated Short Range Communication), the configuration information further configures the user terminal to perform measurement for RSSI of beacon of the DSRC, the RSSI measurement result includes measurement result corresponding to the measurement for the RSSI, and the auxiliary information includes information about transmission source transmitting the beacon.

11. A method for a radio terminal that supports MDT (Minimization of Drive Tests), comprising:

receiving configuration information from a network, the configuration information configuring the radio terminal to perform an RSSI (Received Signal Strength Indicator) measurement in an unlicensed frequency band and an acquisition of location information of the radio terminal;

performing the RSSI measurement and the acquisition of the location information, based on the configuration information;

transmitting an RSSI measurement result corresponding to result of the RSSI measurement together with the location information, to the network;

performing a reception process of a radio signal detected in the unlicensed frequency band and generate auxiliary information based on a content of the radio signal; and transmitting the auxiliary information together with the RSSI measurement result, wherein the unlicensed frequency band includes frequency band of DSRC (Dedicated Short Range Communication), the configuration information further configures the user terminal to perform measurement for RSSI of beacon of the DSRC, the RSSI measurement result includes measurement result corresponding to the measurement for the RSSI, and the auxiliary information includes information about transmission source transmitting the beacon.

\* \* \* \* \*